L. P. GORTON.
CENTRIFUGAL LUBRICATING CUP FOR LOOSE PULLEYS.
APPLICATION FILED MAY 13, 1920.
1,388,251.
Patented Aug. 23, 1921.
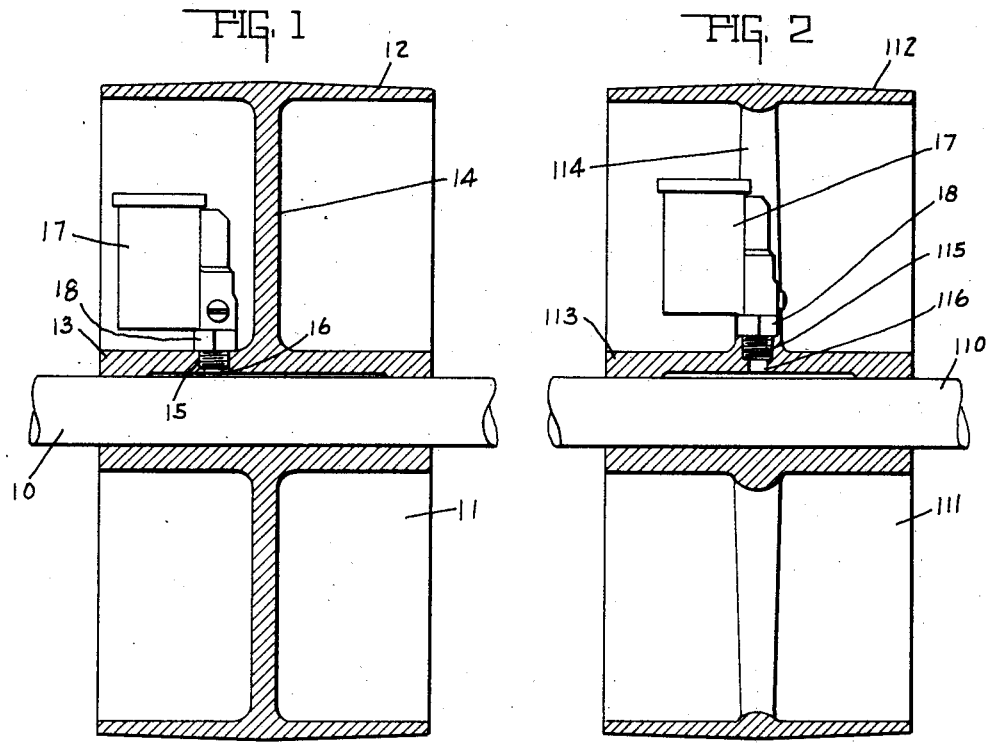
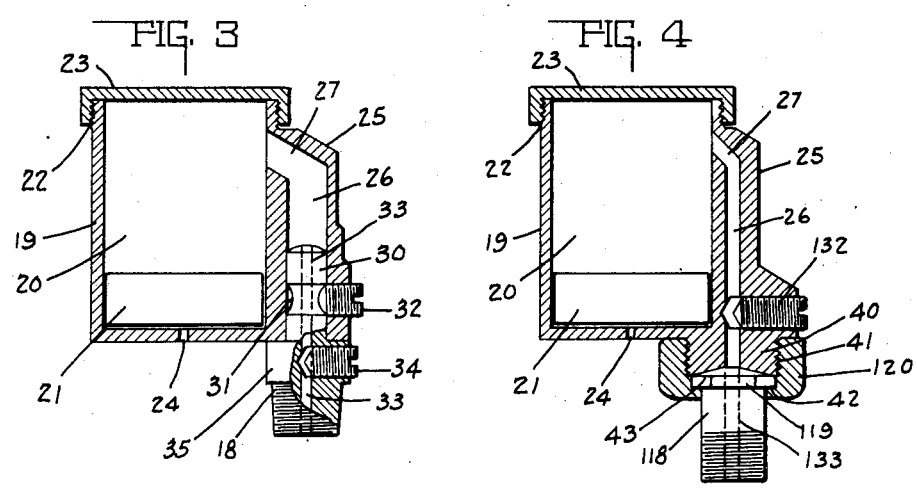
INVENTOR.
LYCURGUS P. GORTON.
BY
*Lockwood & Lockwood*
ATTORNEYS

UNITED STATES PATENT OFFICE.

LYCURGUS P. GORTON, OF INDIANAPOLIS, INDIANA.

CENTRIFUGAL LUBRICATING-CUP FOR LOOSE PULLEYS.

1,388,251.   Specification of Letters Patent.   Patented Aug. 23, 1921.

Application filed May 13, 1920. Serial No. 381,082.

*To all whom it may concern:*

Be it known that I, LYCURGUS P. GORTON, a citizen of the United States, and a resident of Indianapolis, county of Marion, and State of Indiana, have invented a certain new and useful Centrifugal Lubricating-Cup for Loose Pulleys; and I do hereby declare that the following is a full, clear, and exact description thereof, reference being had to the accompanying drawings, in which like numerals refer to like parts.

This invention relates to lubricating devices for rotating members, such as loose pulleys and the like, wherein the lubricating cup is provided with a centrifugally operated piston member for discharging lubricant from the cup in opposition to the centrifugal force thereon.

The chief object of this invention is to provide a cup of the type specified, which may be positioned upon loose pulleys and the like in such a manner that said cup discharges the lubricant near the center of the loose pulley bearing surface irrespective of the size of said cup or the construction of the pulley.

Another object of the invention is to construct the lubricating cup of the type specified with but few parts and these of simple construction.

The chief feature of the invention consists in providing the lubricating cup of the type specified with a lateral discharge channel and detachably securing the channel-forming means to a nipple member after the same has been secured to the loose pulley hub.

One feature of the invention consists in positioning the nipple and the channel-forming means relative to each other such that a straight discharge channel is provided from said cup to the part to be lubricated.

Another feature of the invention consists in providing the lubricating discharge channel with suitable valve regulating means.

The full nature of the invention will be understood from the accompanying drawings and the following description and claims.

In the drawings Figure 1 illustrates a central sectional view of a loose pulley provided with a solid supporting flange, and to which is secured the improved lubricating cup. Fig. 2 is a central sectional view of a loose pulley provided with central supporting spokes and to which the invention has been applied. Fig. 3 is an enlarged central sectional view of one form of the lubricating cup, shown in elevation in Figs. 1 and 2. Fig. 4 is a central sectional view of the preferred form of said cup.

In the drawings 10 indicates a suitable shaft upon which is loosely and rotatably supported the loose pulley 11. In Fig. 1 the loose pulley periphery is secured in spaced relation with the hub 13 by means of the web plate 14. The hub 13 is provided with a suitably threaded opening 15 and a lubricant discharging port 16 adjacent the web portion of said hub and near the center thereof.

The grease cup 17 is herein shown provided with a detachable nipple 18. With the foregoing construction, it will be noted that the nipple 18 may be threaded into the threaded opening 15, and to the same is detachably secured the cup 17. The cup 17, if the same were not detachably secured, could not be positioned adjacent the web 14, but necessarily would be spaced a considerable distance therefrom.

In Fig. 2 the shaft 110 suitably and rotatably supports the loose pulley 111, the same being provided with a peripheral portion 112 and a hub portion 113, said peripheral portion being maintained in spaced relation with said hub portion by the spider arms or spoke members 114. The hub portion 113 of this type of pulley is provided with a threaded opening 115 and a lubricant discharging port 116 into which the lubricating cup member 17 discharges through the detachable nipple 18. With this construction, it will be noted that the detachable nipple 18 is secured in the center of the loose pulley hub and between the spokes of said loose pulley. The cup portion 17 is suitably and detachably secured to said nipple portion 18 to supply lubricant to the bearing surfaces of the shaft and the loose pulley hub.

In Figs. 3 and 4 a preferred form and a modified form of the lubricating cup are illustrated. In Fig. 3 the body portion of said cup is indicated by the numeral 19. Said body portion is substantially cylindrical in form and is provided with a cylindrical chamber 20 in which is slidably mounted a solid cylindrical stemless piston member 21. One end of said body portion 19 is open and the adjacent edge of the same is exteriorly threaded at 22 to receive a suitable closure member or cap 23. The cover cap 23 is provided so that lubricant may be re-supplied to the chamber 20 when the lubricant has been exhausted therefrom. To insure ease of operation and to relieve the vacuum formed behind the piston 21, a small port or orifice 24 is provided in the other end of said body portion.

Suitable discharge means communicates with the chamber 20 near the cap inclosed end of the body 19. Said discharge means comprises a lateral offset body portion 25, and the same in the present instance is shown formed integral with the body portion 19. Within the lateral discharge means 25 is a discharge channel 26, the latter being parallel to the axis of said cylindrical lubricating cup. The longitudinally extending channel 26 communicates with the chamber 20 through an angularly extending opening or slot 27. With this arrangement, it will be noted that the solid piston member 21, under the influence of the centrifugal force generated by the moving pulley, bears against the lubricant or grease contained within the chamber 20 to force the same, in opposition to the centrifugal force upon said lubricant, outwardly toward the cap and into the angularly extending slot 27 and thence into the longitudinally extending channel 26, from whence the same is conveyed by suitable means to the pulley bearing surface to be lubricated.

In Fig. 3 the means for conveying the lubricant to the pulley bearing surface and for detachably securing the detachable nipple 18 to the lubricant discharging means comprises a plug or stem portion 30, the same having a groove 31. The stem or plug is adapted to be received in the lateral channel-forming portion 25, and suitable means, such as a set screw 32 having a threaded engagement with said channel-forming means and seatable in said groove 31, detachably secures the nipple in said channel-forming means and consequently to said cup.

Extending longitudinally and axially through the nipple hereinbefore described is a lubricant discharging opening or channel 33. In said nipple is a valve member herein shown in the form of a conically pointed screw 34, whereby the amount of lubricant discharged through the opening or channel 33 may be regulated. The nipple 18 is provided with an exterior surface 35, whereby the same may be readily secured into the loose pulley hub. In the present instance the exterior portion 35 is in the form of a hexagonal nut.

From the foregoing description, it will be noted that after the lubricant is discharged from the chamber 20 and enters the passage 26, the passage forms a straight conduit to the pulley bearing surface. This construction prevents the stoppage of the channel or the accumulation of lubricant in pockets.

In Fig. 4 is illustrated a modified and the preferred form of the invention wherein the means for detachably securing the nipple 118 is slightly different from that shown in Fig. 3. In this instance the channel-forming means, while similarly positioned as shown in Fig. 3, extends beyond the cup to form a projecting portion 40. Said projecting portion 40 is exteriorly threaded at 41 and is provided with a seat 42 adapted to engage the head 43 of the nipple 118. The nipple 118 is exteriorly threaded for engagement with the pulley hub in the manner hereinbefore described. The nipple is also provided with a flanged head 119, the same securing upon the nipple the union or coupling member 120. The union or coupling member 120 is interiorly threaded to receive the exteriorly threaded portion of the projection 40 of the channel-forming means. In the present construction the nipple is provided with an opening 133 extending axially and longitudinally thereof and is adapted to register with the channel 26, whereby the same forms a straight lubricant discharging channel from the cup to the pulley bearing surface. Suitable valve means in this instance comprises a threaded screw 132 seatable in the channel-forming means 25.

With the foregoing construction, it will be understood that when either of the cups shown are to be secured to the pulley, shown in Fig. 1, the nipple member 18 or 118, the latter having a hexagonal head portion 119, is threaded into the pulley lubricating opening 15 and rigidly secured thereto. To the nipple 18 or 118 is suitably secured the cup 17 by detachably securing the channel-forming means to said nipple means. With the means herein shown in detail in Figs. 3 and 4, the cup may be positioned above said nipple and the securing means actuated or operated upon to secure the cup to the nipple without the necessity of revolving said cup or moving the same from the position indicated. Thus, in Fig. 1, the cup may be suitably positioned within the pulley and will discharge adjacent the center thereof. In Fig. 2 the foregoing constructions, when similarly secured thereto, permit the cup to be secured between the spokes of the pulley and the same to discharge lubricant at the center of the pulley hub and upon the bearing surface.

While the invention has been described in great detail, and modifications thereof will suggest themselves to those skilled in the art, one of which is herein illustrated and described, it will be understood that the invention is not to be limited by the detail with which the same has been described, since said modifications are considered to be within the broad purview of this invention, which is the construction of a centrifugally operated lubricating cup, including a piston member, a laterally disposed lubricant discharging channel, a detachable nipple, and means for securing the detachable nipple to the lateral lubricant discharging channel means, whereby the cup may be positioned centrally of the pulley to lubricate the bearing surface thereof.

The invention claimed is:

1. A centrifugal lubricating cup comprising a cup body, discharge means having a channel communicating with said body, a piston in said body for forcing the lubricant into said channel, a nipple for supporting the cup and adapted to be secured to a pulley independently of said cup and provided with a channel therein, and means separable from the cup and nipple detachably securing said cup to said nipple, whereby the discharge channel and the nipple channel are in registration with each other and secure said cup to said pulley.

2. A centrifugal lubricating cup comprising a cup body, discharge means having a channel communicating with said body, a piston in said body for forcing the lubricant into said channel, a nipple for supporting the cup and adapted to be secured to a pulley independently of said cup and provided with a channel therein, means separable from the cup and nipple detachably securing said cup to said nipple, whereby the discharge channel and the nipple channel are in registration with each other and secure said cup to said pulley, and valve means in said united channels for regulating the flow of lubricant therethrough.

3. A centrifugal lubricating cup comprising a cup body, discharge means lateral thereof and having a channel communicating with said body, a stemless piston in said body for forcing the lubricant into said channel, a nipple for supporting the cup and adapted to be secured to a pulley independently of said cup and provided with a channel therein, and means separable from the cup and nipple detachably securing said lateral discharge means to said nipple, whereby the channels thereof are in registration with each other and secure said cup to said pulley.

4. A centrifugal lubricating cup comprising a cup body, discharge means lateral thereof and having a channel communicating with said body, a solid piston in said body for forcing the lubricant into said channel, a nipple for supporting the cup and adapted to be secured to a pulley independently of said cup and provided with a channel therein, and means separable from the cup and nipple detachably securing said lateral discharge means to said nipple, whereby the channels thereof are in registration with each other and secure said cup to said pulley.

5. A centrifugal lubricating cup comprising a cup body, discharge means lateral thereof and having a channel communicating with said body, a stemless solid piston in said body for forcing the lubricant into said channel, a nipple for supporting the cup and adapted to be secured to a pulley independently of said cup and provided with a channel therein, and means separable from the cup and nipple detachably securing said lateral discharge means to said nipple, whereby the channels thereof are in registration with each other and secure said cup to said pulley.

6. In a loose pulley construction, the combination with a loose pulley including a hub, a peripheral portion, and supporting means therebetween, of a lubricating cup, nipple means for supporting the cup and adapted to be secured to the pulley hub near the supporting means thereof for lubricating the bearing surface thereof, and means separable from the cup and nipple detachably securing said lubricating cup to said nipple means for securing said cup to said pulley.

7. In a loose pulley construction, the combination with a loose pulley including a hub, a peripheral portion, and supporting means therebetween, of a lubricating cup provided with lateral discharge means, nipple means for supporting the cup and adapted to be secured to the pulley hub near the supporting means thereof for lubricating the bearing surface thereof, and means separable from the cup and nipple detachably securing said nipple to said lateral discharge means for securing said cup to said pulley.

In witness whereof, I have hereunto affixed my signature.

LYCURGUS P. GORTON.